US012759218B2

(12) United States Patent
Suzuki

(10) Patent No.: US 12,759,218 B2
(45) Date of Patent: Oct. 13, 2026

(54) INFORMATION PROCESSING DEVICE, IMPRINTING DEVICE, STORAGE MEDIUM, AND ARTICLE MANUFACTURING METHOD

(71) Applicant: CANON KABUSHIKI KAISHA, Tokyo (JP)

(72) Inventor: Ryohei Suzuki, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 719 days.

(21) Appl. No.: 18/148,283

(22) Filed: Dec. 29, 2022

(65) Prior Publication Data

US 2023/0264412 A1 Aug. 24, 2023

(30) Foreign Application Priority Data

Feb. 18, 2022 (JP) ................................ 2022-023516

(51) Int. Cl.
*B29C 59/00* (2006.01)
*B29C 59/02* (2006.01)

(52) U.S. Cl.
CPC .......... *B29C 59/002* (2013.01); *B29C 59/022* (2013.01); *B29C 59/026* (2013.01); *B29C 2059/023* (2013.01)

(58) Field of Classification Search
CPC ..... B29C 59/002; B29C 59/02; B29C 59/026; B29C 59/022; B29C 2059/023
See application file for complete search history.

(56) References Cited

U.S. PATENT DOCUMENTS

| | | | |
|---|---|---|---|
| 8,945,444 B2 * | 2/2015 | Lu | B29C 43/003 264/40.5 |
| 9,090,014 B2 | 7/2015 | Lu et al. | |
| 2021/0173986 A1 | 6/2021 | Narioka et al. | |
| 2021/0216697 A1 * | 7/2021 | Van Den Brink | G06F 30/398 |

FOREIGN PATENT DOCUMENTS

| | | |
|---|---|---|
| JP | 5433584 B2 | 3/2014 |
| JP | 2015026671 A | 2/2015 |
| JP | 2016157784 A | 9/2016 |
| JP | 2021089987 A | 6/2021 |
| KR | 20180136903 A | 12/2018 |

OTHER PUBLICATIONS

Notice of Preliminary Rejection issued in Korean Patent Application No. 10-2023-0016527 mailed Jul. 24, 2025.

* cited by examiner

*Primary Examiner* — Christina A Johnson
*Assistant Examiner* — Kelsey C Grace
(74) *Attorney, Agent, or Firm* — ROSSI, KIMMS & McDOWELL LLP

(57) ABSTRACT

To provide an information processing device, or the like that can reduce cost and time required for adjusting a profile of imprinting of an imprinting device, the information processing device for performing simulation of the imprinting with the imprinting device includes a curvature acquisition unit that acquires a change of a curvature of a pattern part in a vicinity of an outer circumference of a contact surface when the pattern part is brought in contact with an imprinting material in the imprinting, and a profile adjustment unit that adjusts a profile of the imprinting of the pattern part such that the curvature does not fall below a predetermined threshold.

15 Claims, 10 Drawing Sheets

INFORMATION PROCESSING DEVICE, IMPRINTING DEVICE, STORAGE MEDIUM, AND ARTICLE MANUFACTURING METHOD

BACKGROUND OF THE INVENTION

Field of the Invention

The present invention relates to an information processing device, an imprinting device, a storage medium, an article manufacturing method, and the like.

Description of the Related Art

Imprinting techniques have gained attention as new patterning techniques for manufacturing semiconductor devices. In such an imprinting device, a force that presses a mold onto a substrate such as a silicon wafer or a glass plate (imprinting force), a pressure that inflates the mold when it is pressed (cavity pressure), a speed at which the mold is brought in contact with an imprinting material, and the like are controlled chronologically according to a predetermined profile.

Although Japanese Patent No. 5433584 describes that actions of an imprinting force and cavity pressure during imprinting are controlled based on a chronological imprinting profile, if the imprinting profile is not appropriately adjusted, bubbles entrained during imprinting may cause a poor pattern.

In addition, occurrence of a poor pattern is predicted by calculating an amount of residual gas between a mold and a substrate during imprinting as described recently in JP-A-2021-89987. By using a simulator as described therein, imprinting performance under arbitrary conditions can be ascertained without performing imprinting with an actual machine.

The imprinting operation is performed multiple times under the condition that each time the external environment of the mold, substrate, and the like changes according to the above-described imprinting profile, the conditions are finely adjusted to conditions under which a poor pattern does not occur. In addition, it takes time to find a poor pattern by using a direct observation method with a defect inspection device each time of imprinting. Such an adjustment method that has been achieved through trial and error described above has a problem that an enormous amount of time and cost are required for the adjustment each time an external environment changes.

One of objectives of the present invention is to provide an information processing device and the like that can reduce time and cost for adjusting an imprinting profile for an imprinting device.

SUMMARY OF THE INVENTION

An information processing device according to an aspect of the present invention to solve the above-described problem is an information processing device that performs simulation of imprinting with an imprinting device and includes at least one processor or circuit configured to function as a curvature acquisition unit that acquires a change of a curvature of a pattern part in a vicinity of an outer circumference of a contact surface when the pattern part is brought in contact with an imprinting material in the imprinting, and a profile adjustment unit that adjusts a profile of the imprinting of the pattern part such that the curvature does not fall below a predetermined threshold.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
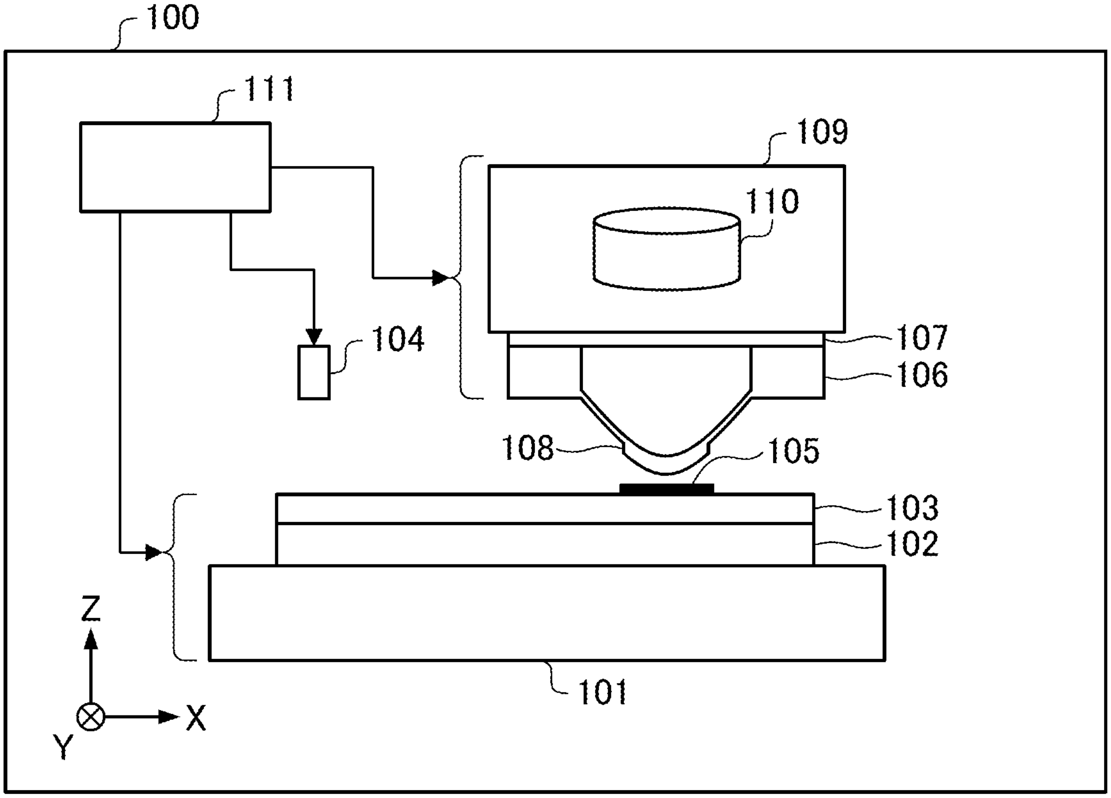
FIG. 1 is a diagram illustrating a configuration of an imprinting device according to a first embodiment.

FIG. 1 is a diagram illustrating a configuration of an imprinting device according to a first embodiment.

An imprinting device 100 according to the first embodiment brings an imprinting material 105 supplied on a substrate 103 in contact with a mold 106. Then, energy for curing is applied to the imprinting material 105 to form a pattern of the cured material to which the uneven pattern of the mold 106 has been transferred.

For the imprinting material 105, a curable composition that is cured when energy for curing is applied is used. Electromagnetic waves, heat, and the like may be used as the energy for curing. Electromagnetic waves include, for example, infrared rays, visible light rays, ultraviolet rays, and the like whose wavelengths are selected from the range of 10 nm to 1 mm. The curable composition is a composition that is cured due to light radiation or heating.

Among such compositions, photocurable compositions that is cured due to light radiation may contain at least a polymerizable compound and a photopolymerization initiator, and may further contain a non-polymerizable compound or a solvent if necessary. A non-polymerizable compound is at least one type selected from the group of sensitizers, hydrogen donors, internal mold release agents, surfactants, antioxidants, polymer components and the like.

The substrate 103 is, for example, a silicon wafer, a compound semiconductor wafer, quartz glass, and the like, and for example, glass, ceramics, a metal, a semiconductor, a resin, or the like is used as a material of the substrate 103. A member formed of a different material from that of the substrate may be provided on a surface of the substrate, if necessary.

Although the imprinting device 100 employs a photocuring method of curing the imprinting material 105 through radiation of ultraviolet rays in the present embodiment in FIG. 1, the invention is not limited thereto, and for example, a thermal curing method of curing an imprinting material with heat input can also be employed.

The imprinting device 100 illustrated in FIG. 1 imprints a pattern of a pattern part 108 onto the imprinting material 105 on the substrate 103 using the mold 106 on which the pattern part 108 is formed.

A substrate holding part 102 is disposed on a substrate stage 101, and the substrate 103 is adsorbed and held on the substrate holding part 102. Misalignment of the substrate 103 can be detected by observing an alignment mark provided on the substrate 103 with an alignment optical system, which is not illustrated.

Meanwhile, the mold 106 is held by a mold holding part 107. A dispenser 104 supplies the imprinting material 105 as a photocurable resin onto the substrate 103. When the mold 106 is lowered by a mold drive part 109 to be brought in contact with the imprinting material 105 supplied on the substrate 103, the imprinting material 105 flows into pattern grooves carved in the pattern part 108.

At this time, when positive pressure is applied as cavity pressure to the cavity between the mold 106 and the mold holding part 107, the pattern part 108 is curved in a convex shape as illustrated in FIG. 1. Thus, the pattern part 108 can be brought in contact with the imprinting material 105 supplied on the substrate 103 from the center thereof.

Further, although the mold drive part 109 is a mechanism that lowers or raises the mold 106 with respect to the substrate 103, it may be a mechanism that relatively changes the gap between the mold 106 and the substrate 103.

A spread camera 110 includes a sensor, an image acquisition part, and a beam radiation part for monochromatic light, and the beam radiation part radiates monochromatic light through the transparent pattern part 108. In addition, due to the sensor, a state of a gradually widening contact area of the pattern part 108 and the imprinting material 105 can be captured.

In addition, the sensor enables interference fringes (Newton's rings) formed on an outer side in the periphery of the outer circumference of the contact surface of the pattern part 108 and the imprinting material 105 to be captured.

A control part 111 controls the entire imprinting device and includes a CPU as a computer. The CPU of the control part 111 controls operations of each part of the entire imprinting device based on a computer program stored in a memory, which is not illustrated, as a storage medium.

In the first embodiment, the imprinting device is used to adjust an imprinting profile. Further, the imprinting profile of the present embodiment means a pattern in which various control parameters required to perform an imprinting operation chronologically change. Details thereof will be described below.

In the first embodiment, the step of adjusting the imprinting profile is broadly divided into two processes of a curvature threshold determination process and an imprinting profile adjustment process. In the curvature threshold determination process, a threshold of a mask curvature that does not affect filling performance is obtained from environment information of a wafer, a mask, and the like to be used and a target filling time.

Figure 2:
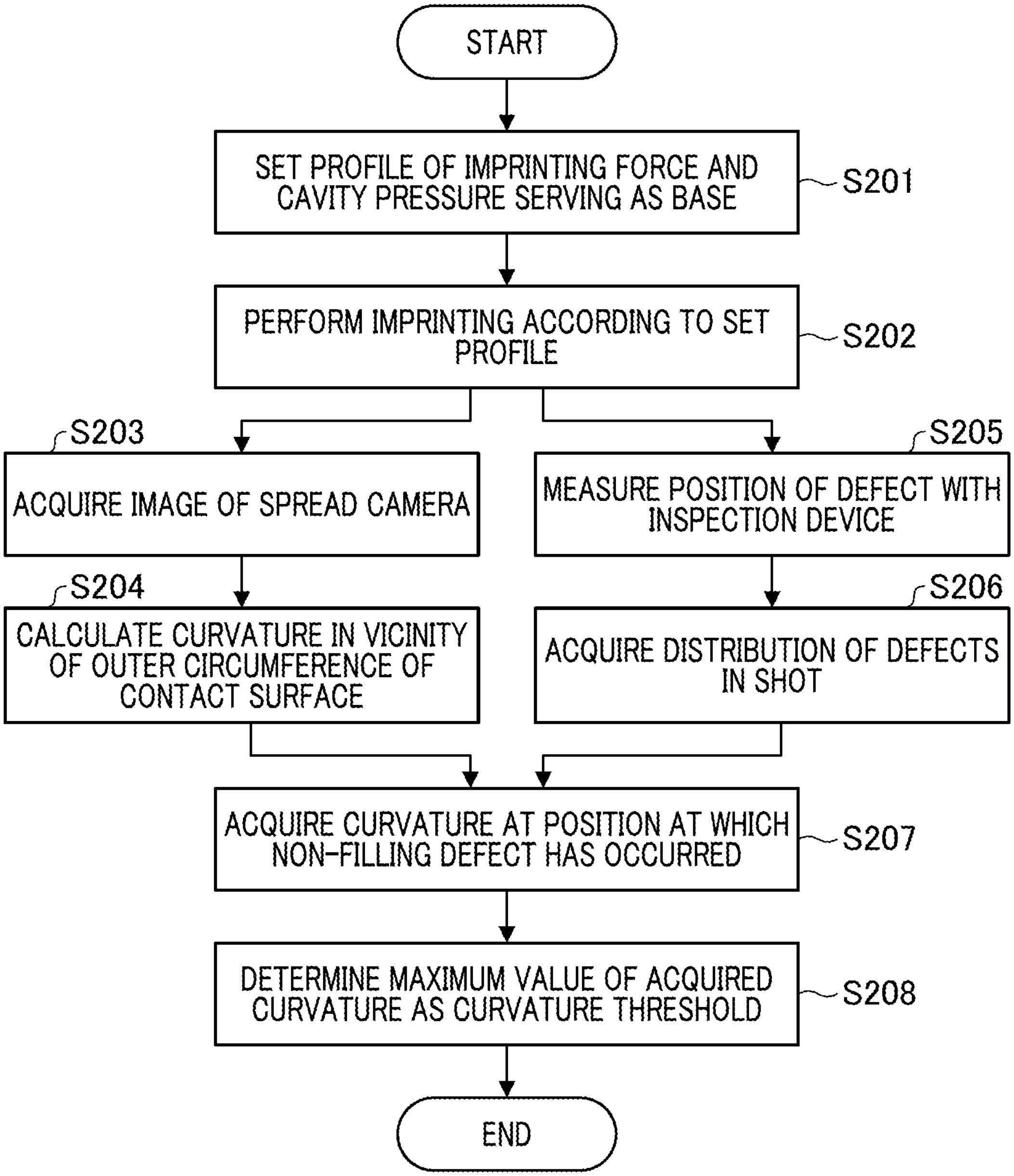
FIG. 2 is a flowchart showing the flow of curvature threshold determination according to the first embodiment.

FIG. 2 is a flowchart showing the flow of curvature threshold determination according to the first embodiment. Further, the operation of each step of FIG. 2 is performed by the computer included in the control part 111 executing the computer program stored in the memory.

First, in step S201, a chronological profile of an imprinting force, cavity pressure, etc. that serves as a base (reference) is set as an imprinting profile. According to the imprinting profile, when a maximum imprinting force is too weak compared to cavity pressure, the imprinting ends with a part of the pattern part not coming in contact with the imprinting material. Thus, it is desirable to set a chronological imprinting profile in which a maximum imprinting force is somewhat high as a base.

Next, imprinting is performed according to the imprinting profile that is set in step S202. Control parameters and device environment (temperature, humidity, etc.) other than the imprinting profile at that time are set to appropriate optimum conditions.

An image of the spread camera is acquired in step S203, and the curvature of the pattern part in the Z direction during imprinting is acquired from the image of the spread camera by calculation in step S204.

Here, steps S203 and S204 function as a curvature acquisition step (curvature acquisition unit) of acquiring a change in the curvature of the pattern part in the periphery of the outer circumference of the contact surface when the pattern part is brought in contact with the imprinting material during imprinting.

Figure 3:
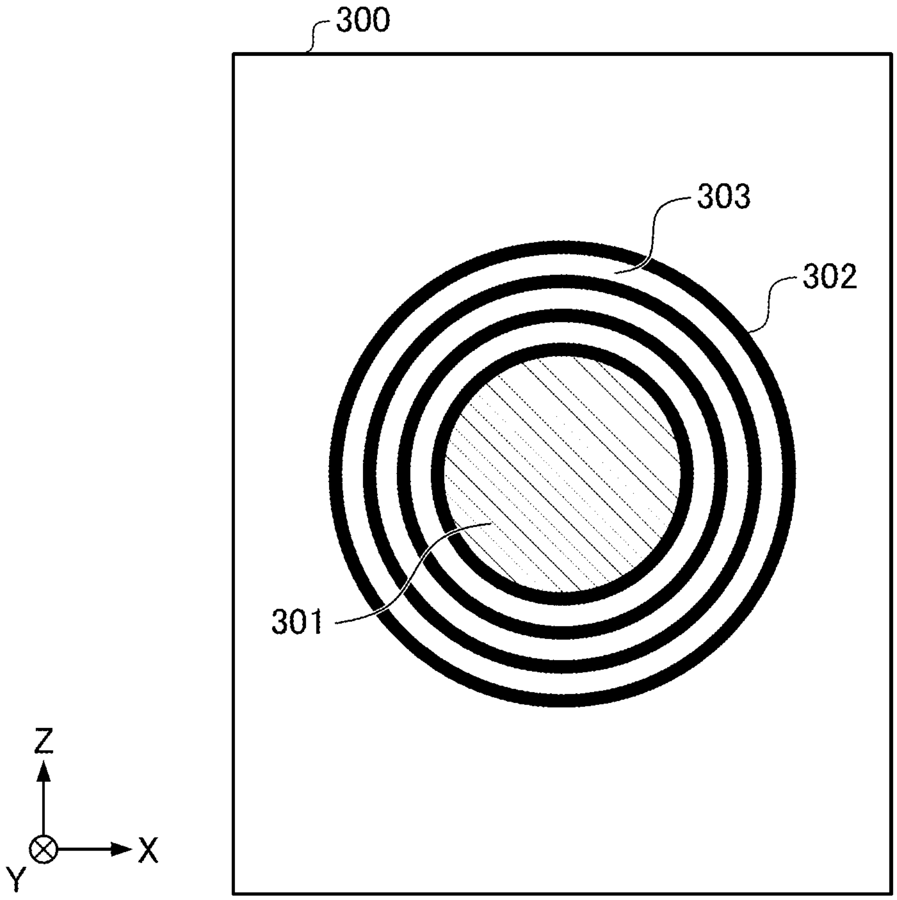
FIG. 3 is a diagram illustrating an example of interference fringes taken by a spread camera.

FIG. 3 is a diagram illustrating interference fringes taken by the spread camera, schematically showing a fringe pattern (Newton's rings) taken by the spread camera 110 during imprinting. Although the fringe pattern is schematically divided into two patterns of dark parts 302 and bright parts 303, actually, there are gradations from white to black between the bright parts and the dark parts.

FIG. 3 illustrates a state in which the imprinting material is pressed and spread from the center of the pattern part 108, and the shaded part 301 represents the portion of the imprinting material already pressed and spread by the pattern part 108.

In a region in which a radiation beam of the spread camera is monochromatic light and the gap between the pattern part and the substrate is sufficiently narrow, the dark parts 302 and the bright parts 303 alternately appear due to interference of light. This fringe pattern is called an "interference fringe" or "Newton's rings."

An interference fringe appears due to a difference between light wavelengths of beams, that is, a difference between the height of the substrate surface and the height of the mold surface in the case of the present embodiment. Thus, if coordinates of the dark parts 302 and the bright parts 303 of the interference fringe are obtained, the height of the pattern part 108 from the substrate surface at the coordinates can be obtained.

The shape of the pattern part 108 (distribution of heights in the Z direction) during imprinting is obtained from information of the heights of the pattern part 108 from the top surface of the substrate 103 at the arbitrary coordinates obtained as described above.

In step S204, the curvature of the pattern part 108 in the periphery of the outer circumference of the contract surface of the pattern part 108 and the imprinting material 105 (or the substrate 103) of the outer circumference part of the shaded part 301 is calculated based on the coordinates of the dark parts 302 and the bright parts 303 of the interference fringe. Then, information about the chronological change in the distribution of the curvatures is stored in a memory, which is not illustrated.

Figure 4:
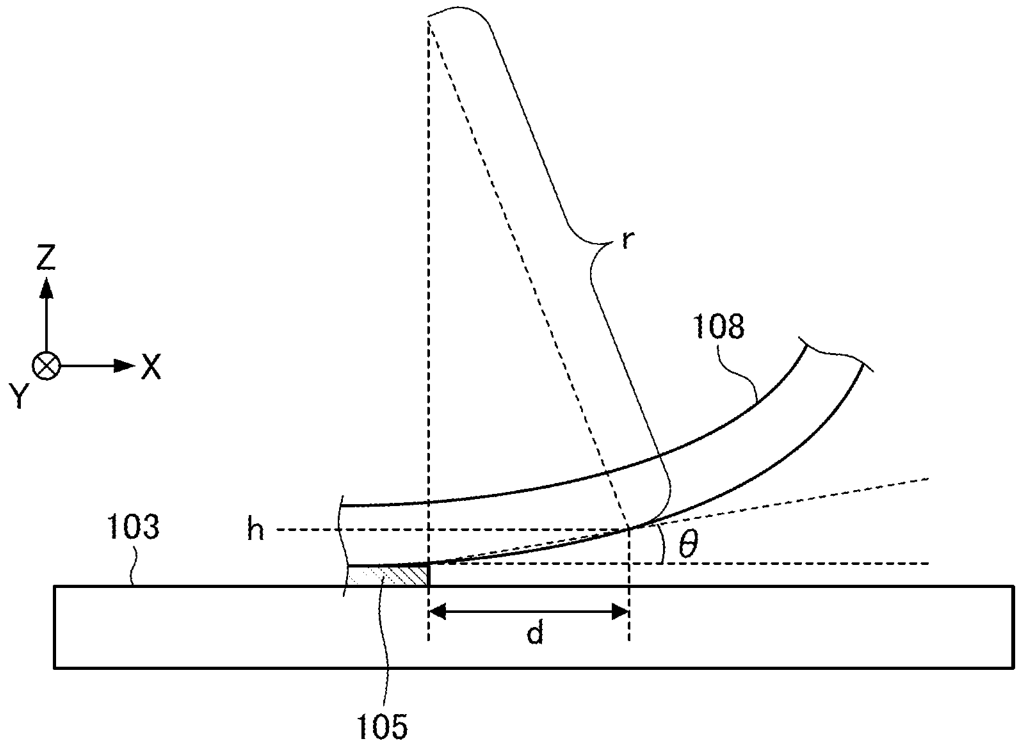
FIG. 4 is a diagram illustrating a shape in the periphery of the outer circumference of a contact surface of a pattern part according to the first embodiment.

FIG. 4 is a diagram illustrating the shape the periphery of the outer circumference of the contact surface of the pattern part according to the first embodiment, showing the vicinities of the outer circumference of the contact surface of the substrate 103, the imprinting material 105, and the pattern part 108.

The curvature of the pattern part in the Z direction is obtained based on the shape of the periphery of the outer circumference of the contact surface as illustrated obtained from the interference fringe. The width of the region in the periphery of the outer circumference of the contact surface in the X direction used in the calculation of the curvature may be set to an arbitrary width d. However, the width d is fixed in adjustment of one imprinting profile.

Further, a curvature (curvature information) of the present embodiment may be expressed by the reciprocal of a curvature radius r in FIG. 4, and may be expressed by a tangent angle θ of the pattern part 108 at the width d with respect to a tangent angle of the pattern part 108 at the outer circumference part of the contact surface in FIG. 4.

Alternatively, a curvature may be expressed by a height h of the pattern part 108 at the position of the width d with respect to a height of the pattern part 108 at the outer circumference part of the contact surface in FIG. 4. Alternatively, it may be expressed by a slope h/d, or the like by using h. That is, the curvature (curvature information) of the present embodiment includes any one of the above-described reciprocal of the curvature radius r, angle θ, height h, slope h/d, and the like.

Meanwhile, in step S205, the substrate is transported to a defect inspection device. Then, the defect inspection device specifies the coordinates of a defect that has occurred due to obstructed filling of the imprinted substrate in step S202 with the imprinting material caused by residual bubbles or the like (non-filling defect). Here, the defect inspection device functions as a measurement unit that measures a position of a defect of imprinting.

Furthermore, in step S206, a distribution of defects in a shot is acquired.

Here, steps S205 and S206 function as a defect position acquisition step (defect position acquisition unit) of acquiring the position of a defect of imprinting.

Further, although steps S203 and S204 are expressed in parallel with steps S205 and S206 in FIG. 2, for example, the processing of steps S205 and S206 may be performed after steps S203 and S204.

Figure 5:
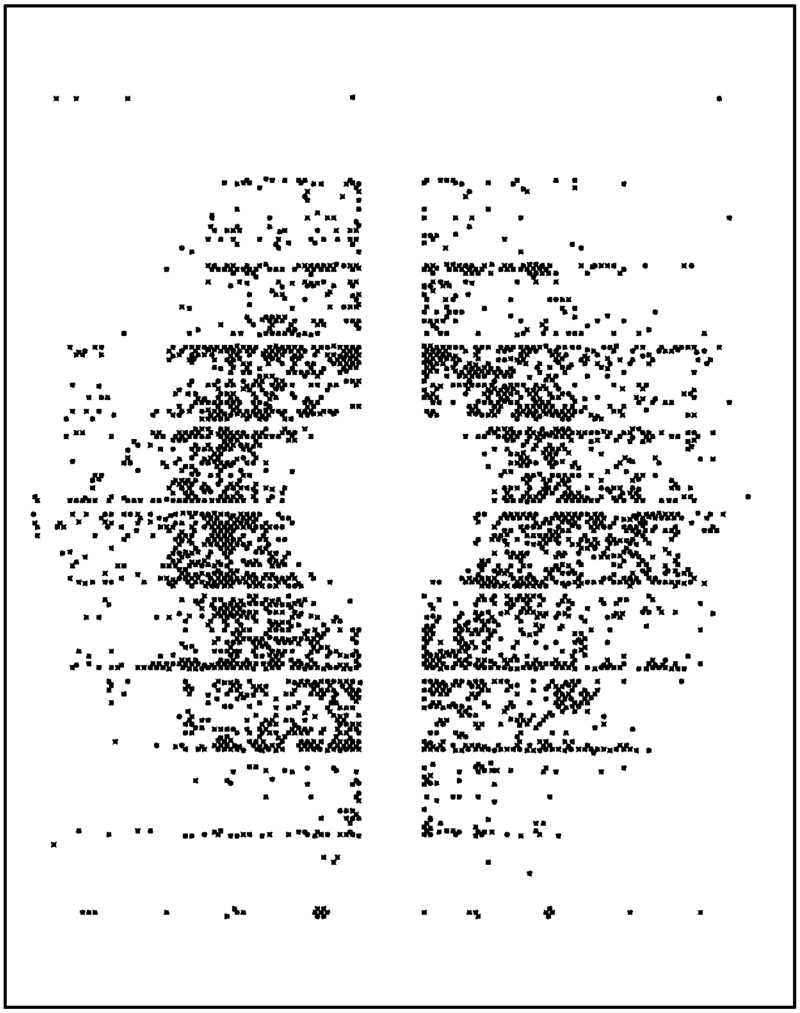
FIG. 5 is a diagram showing experimental data of the distribution of defects output by a detect inspection device according to the first embodiment.

FIG. 5 is a diagram showing experimental data of a distribution of defects output by the detect inspection device according to the first embodiment, showing the experimental data of the distribution of non-filling defects measured by using the defect inspection device (KT2905 manufactured by KLA Corporation). Further, a defect inspection device is not limited to the above-described defect inspection device. In addition, the defect inspection device may be provided inside or outside the imprinting device.

The non-filling defect mostly appears in a concentric shape formed from the initial contact point of the substrate and the pattern part, as illustrated in FIG. 5. The reason for this is that, when the contact surface becomes wider in a concentric shape as imprinting progresses, bubble trapping that occurs when the widening speed of the contact surface is too fast takes place also in a concentric shape.

In step S207, the curvature at the position at which a non-filling defect has occurred is acquired from the chronological change in the curvature distribution calculated by using the image of the spread camera in step S204 and the distribution of defects acquired in step S206.

Figure 6:
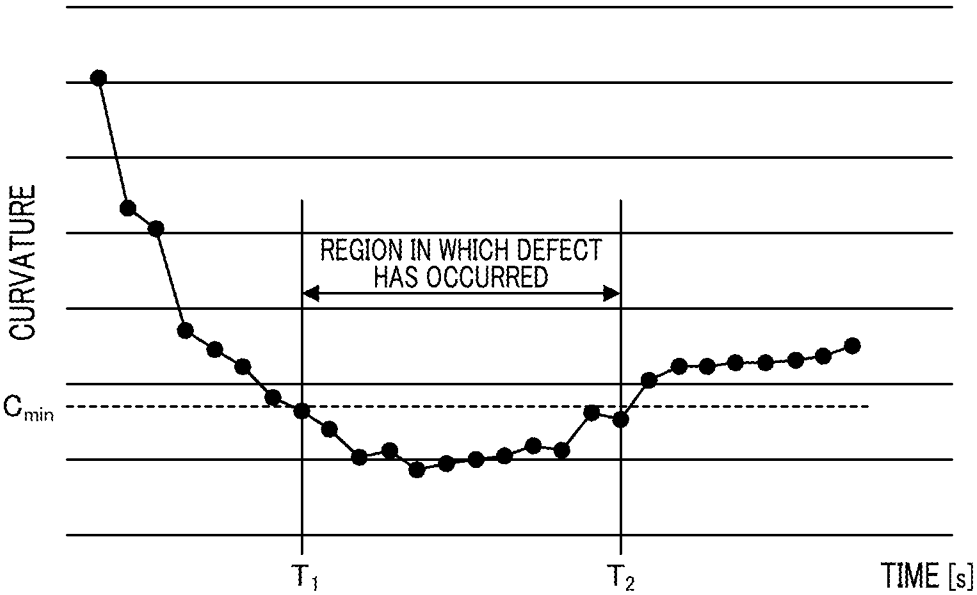
FIG. 6 is a diagram showing an example of experimental data of a chronological change of a curvature calculated from an image of a spread camera according to the first embodiment.

FIG. 6 is a diagram showing an example of experimental data of the chronological change of the curvature calculated from the image of the spread camera according to the first embodiment. The chronological change of the curvature shown in FIG. 6 is referred to, and transition of curvature at the spot at which the non-filling defect has occurred is extracted.

Further, in FIG. 6, the transition of curvature in the imprinting operation under the same condition as the distribution of non-filling defects illustrated in FIG. 5 is shown, and the range from a time T1 to a time T2 corresponds to the region in which a non-filling defect has occurred.

In step S208, a maximum value of the transition of the curvature extracted in step S207 is obtained, and it is held as a threshold for curvature (curvature threshold) at the position of the defect of filling. For example, the threshold is determined as a maximum value Cmin of curvature in the range from the time T1 to the time T2 in FIG. 6. Further, the maximum value Cmin of curvature in the range from the time T1 to the time T2 at which a non-filling defect occurs can also be said to be a minimum value of curvature at which no non-filling defect occurs.

As described above, in step S207 and step S208, a curvature threshold is acquired based on the position of the defect acquired in step S206 and the change of curvature acquired in step S204. If the threshold of curvature (curvature threshold) is determined, an imprinting profile adjustment process is next performed to optimize an imprinting process. In other words, an imprinting profile which is not likely to fall below the curvature threshold determined in step S208 by the pattern part 108 during imprinting is set.

Figure 7:
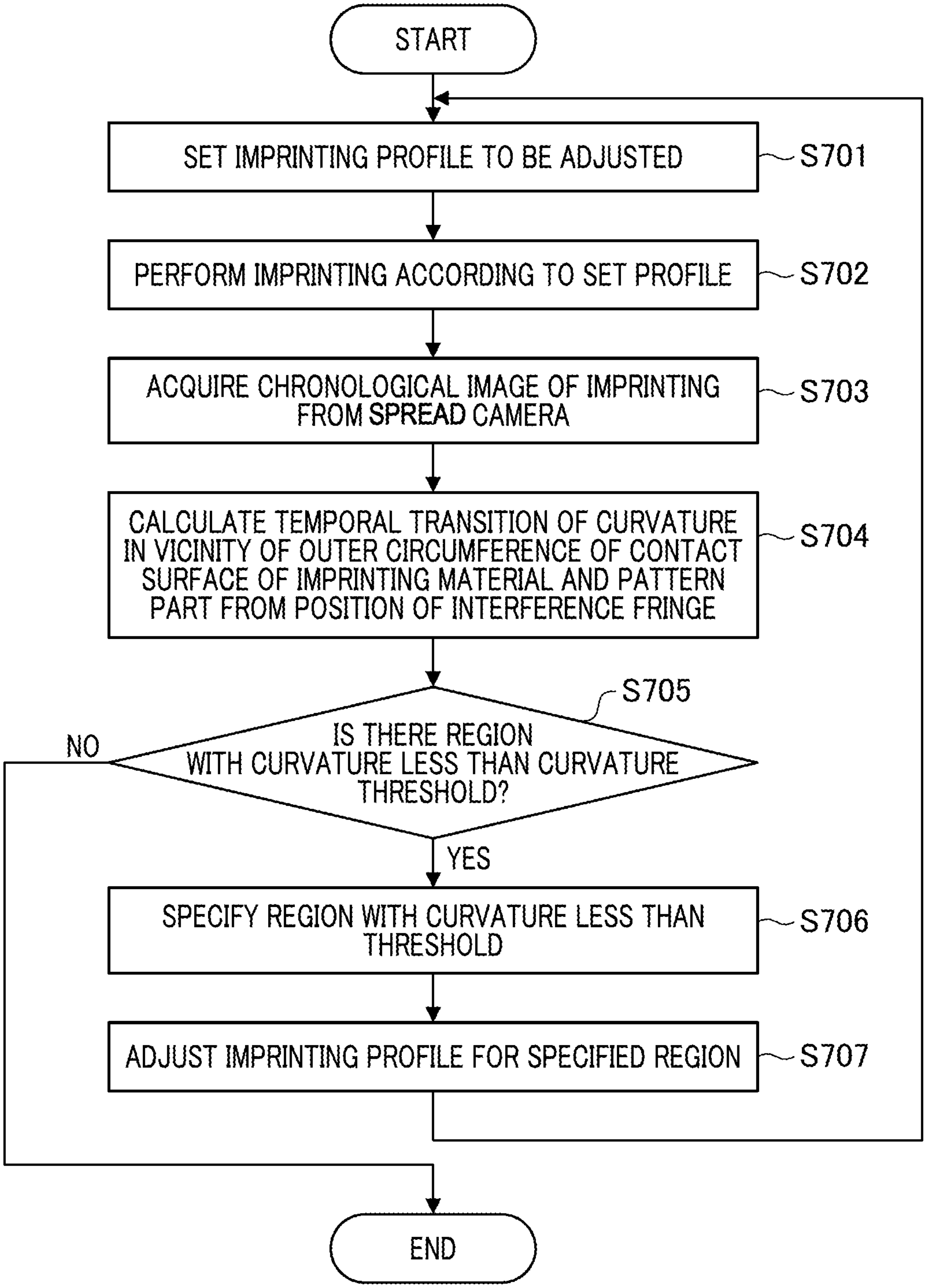
FIG. 7 is a flowchart showing the flow of imprinting profile adjustment according to the first embodiment.

FIG. 7 is a flowchart showing the flow of the imprinting profile adjustment according to the first embodiment.

Further, the operation of each step of the flowchart of FIG. 7 is performed by the computer included in the control part 111 executing the computer program stored in the memory.

In steps S701, S702, S703, and S704, imprinting is performed according to an arbitrary imprinting profile, and a transition of curvature is acquired by using the interference fringe of chronological images of the spread camera as in the flow of the curvature threshold determination.

First, in step S701, a chronological profile about imprinting force, cavity pressure, or the like to be adjusted is set as an imprinting profile. Further, the imprinting profile that is set in step S701 may be the same as or different from the imprinting profile serving as the base that is set in step S201.

Next, in step S702, imprinting is performed according to the profile that is set in step S701, and the chronological images of the imprinting operation are acquired from the spread camera in step S703. Furthermore, in step S704, the temporal transition of curvature in the periphery of the outer circumference of the contract surface of the imprinting material 105 (or the substrate 103) and the pattern part 108 is calculated based on the position of the interference fringe.

Next, in step S705, it is determined whether there is a region with a curvature less than the curvature threshold determined in step S208 in the acquired transition of curvature. If there is a region with a curvature less than the threshold in step S705, a non-filling defect is highly likely to occur, and thus the imprinting profile is adjusted from step S706.

If there is no section with a curvature less than the curvature threshold in step S705, the imprinting profile optimization flow of FIG. 7 ends.

In step S706, at what time (or which region) the curvature is less than the threshold in the determination of S705 is specified. In other words, the time (or region) at which the curvature is less than the curvature threshold is specified.

In step S707, the actions of the imprinting force and cavity pressure designated by the imprinting profile that is set in step S701 are adjusted at the time (region) specified in step S706, and changed such that the curvature does not fall below the curvature threshold.

In other words, an imprinting profile which is not likely to fall below the curvature threshold determined in step S208 by the pattern part 108 during imprinting is set. Thus, the imprinting speed, cavity pressure, and the like are adjusted for the spot at which the mask curvature is less than the threshold, for example, and thereby an optimum imprinting method (imprinting profile) is generated.

Specifically, for example, the imprinting speed for the region becomes slower. The main cause for the decrease in curvature is deformation of the pattern part 108 caused by a gas pressure generated between the imprinting material 105 and the pattern part 108 on the substrate, and thus decrease in curvature can be prevented by slowing down the speed of imprinting performed on the region.

Alternatively, cavity pressure is increased. Due to the operation, the rigidity of the pattern part 108 becomes higher, it becomes difficult for deformation of the pattern part 108 to occur, and thus curvature can be prevented from decreasing.

Further, steps S207, S208, S705, S706, and the like function as profile adjustment steps (profile adjustment units) of adjusting the imprinting profile of the pattern part such that the curvature does not fall below the predetermined threshold.

Further, the imprinting profile adjusted in step S707 may include a chronological profile of an imprinting force that presses the pattern part onto the imprinting material in, for example, an imprinting operation. Alternatively, it may include a chronological profile of a positional relationship (for example, speed, etc.) of the pattern part and the imprinting material or a chronological profile of a pressure to deform the pattern part into a shape that is convex toward the imprinting material.

In other words, the imprinting profile includes at least one of a chronological profile of an imprinting force, a chronological profile of a positional relationship (for example, speed, etc.), and a chronological profile of a pressure to deform the pattern part in a convex shape.

Next, if the imprinting profile is adjusted, the process returns to step S701, and imprinting is performed again by using the adjusted imprinting profile. Finally, if all sections have a curvature that is less than the curvature threshold in step S705, optimization of the imprinting profile is completed.

Then, the control part 111 of the imprinting device 100 uses the imprinting profile adjusted as described above to perform an actual imprinting operation (an operation of imprinting the pattern part 108 on the imprinting material 105). Thus, imprinting without a non-filling defect can be realized.

As described above, in the imprinting profile optimization method according to the first embodiment, the imprinting profile can be adjusted based on image information of the spread camera acquired in the imprinting operation. Thus, unlike a method that has been achieved through trial and error in which defect inspection is performed to check for the presence of a defect each time an imprinting profile is adjusted as in the related art, time and cost required for adjustment can be dramatically reduced.

Second Embodiment

In the first embodiment, patterns are actually formed by the imprinting device, the distribution of curvature of the mold and the distribution of defect are chronologically compared, and thereby the action of imprinting is adjusted. In a second embodiment, an information processing device simulate imprinting by using an imprinting device and adjusts an imprinting profile.

Figure 8:
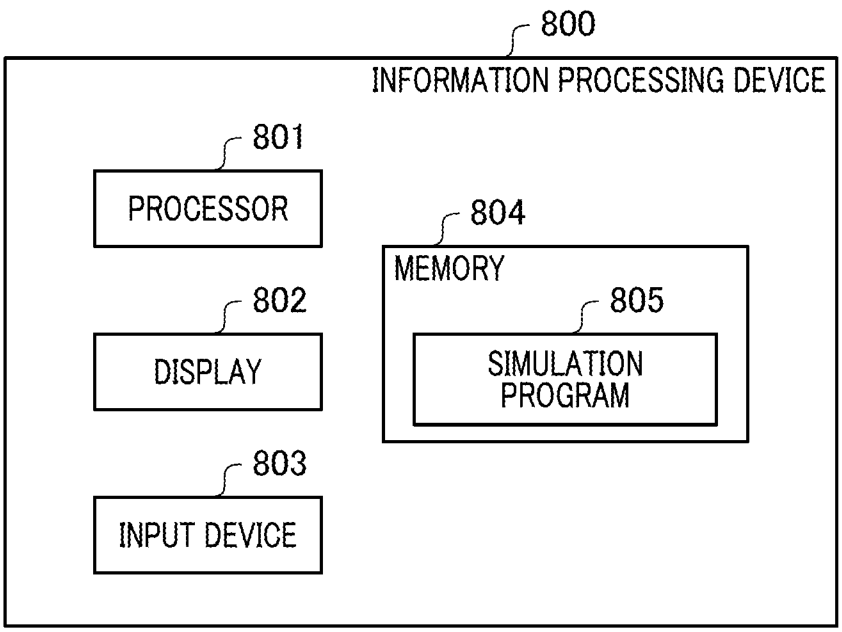
FIG. 8 is a block diagram illustrating a hardware configuration of an information processing device that is used in simulation according to a second embodiment.

FIG. 8 is a block diagram illustrating a hardware configuration of an information processing device that is used in simulation according to the second embodiment.

The information processing device 800 performs calculation to predict (simulate) a shape of the pattern part 108 and an action of the imprinting material 105 in a process executed by the imprinting device 100.

The information processing device 800 is configured by incorporating a simulation program 805 into a multi-purpose or dedicated computer, for example. The information processing device 800 includes a processor 801 as a computer, a memory 804 as a storage medium in which the simulation program 805 is stored, a display 802, an input device 803, and the like. The display 802 includes, for example, a liquid crystal display, and the like, and the input device 803 includes a keyboard, a mouse, a touch panel, and the like.

The memory 804 may be a semiconductor memory, a disk such as a hard disk, or a memory in another form. The simulation program 805 is stored in a memory medium that can be read by the processor 801 as a computer.

Alternatively, the program is provided to the information processing device 800 from outside of the information processing device 800 via a communication facility such as a telecommunication line. Further, the blocks illustrated in FIG. 8 may be built in the same housing, or may be configured by individual devices connected to each other via a signal path.

An imprinting profile adjustment step includes two processes of a curvature threshold determination process and an imprinting profile adjustment process, as in the first embodiment.

Figure 9:
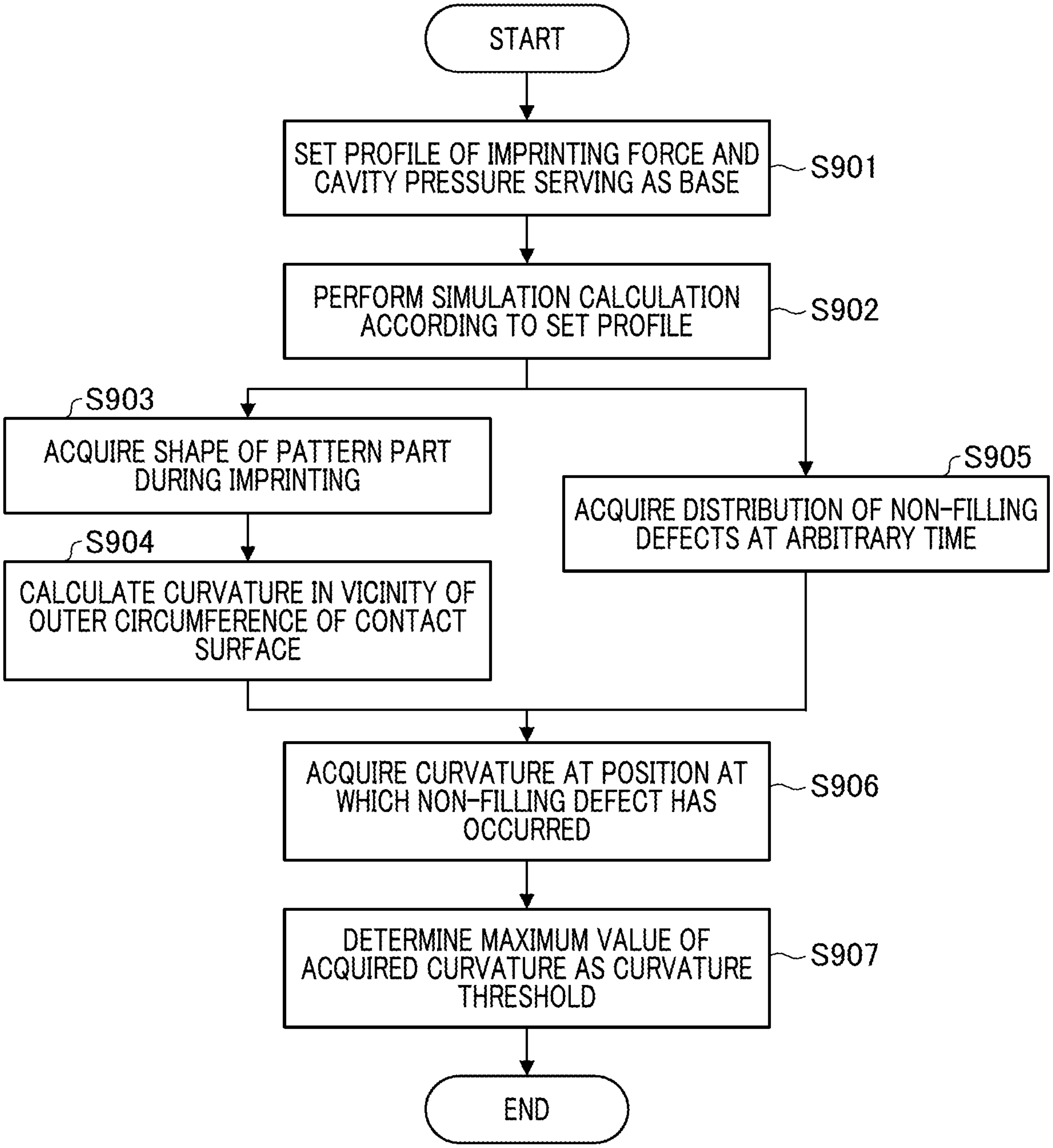
FIG. 9 is a flowchart showing the flow of curvature threshold determination according to the second embodiment.

FIG. 9 is a flowchart showing the flow of determining a threshold of a curvature according to the second embodiment, and the flow of curvature threshold determination by using simulation by the information processing device 800 will be described using FIG. 9.

Further, the operation of each step of the flowchart of FIG. 9 is performed by the processor 801 as a computer executing the simulation program 805 as a computer program stored in the memory 804.

First, in step S901, a chronological profile about imprinting force, cavity pressure, etc. that serves as a base (reference) is set as an imprinting profile.

Next, simulation of an imprinting operation is performed according to the imprinting profile that is set in step S902. Control parameters and device environment (temperature, humidity, etc.) other than the imprinting profile at that time are set to optimum conditions.

In step S903, the shape of the pattern part 108 during imprinting is acquired from the simulation. Specifically, for example, the pressure of gas between the pattern part 108 and the imprinting material is calculated from the simulation, and the shape of the pattern part 108 during imprinting is calculated and acquired based on the pressure of gas and a physical property value of the pattern part 108.

Then, in step 904, the curvature of the pattern part 108 in the vicinity of the outer circumference of the contact surface is calculated from the information. Here, steps S903 and S904 function as a curvature acquisition step (curvature acquisition unit) of acquiring a change in the curvature of the pattern part in the vicinity of the outer circumference of the contact surface when the pattern part is brought in contact with the imprinting material during imprinting.

Further, the curvature (curvature information) of the second embodiment includes any one of the reciprocal of the curvature radius r, angle θ, height h, slope h/d, and the like, as described in the first embodiment.

In addition, a temporal transition of curvature can be acquired by calculating a curvature at arbitrary time intervals from the start of imprinting. In the case of the second embodiment, more highly accurate data can be obtained, compared to the method of the first embodiment in which the shape of the mold is obtained indirectly from the spread camera.

In step S905, occurrence of a non-filling defect is predicted, or a distribution of non-filling defects of in the region subjected to imprinting at an arbitrary time is acquired from the simulation. Here, step S905 functions as a defect position acquisition step (defect position acquisition unit) of acquiring the position of a defect of imprinting.

In the prediction of occurrence of a non-filling defect, the pressure of gas between the pattern part 108 and the substrate 103 is chronologically obtained from the simulation, for example. Then, the amount of residual gas between the pattern part 108 and the imprinting material 105 when imprinting ends is obtained based on the pressure of the gas, and a position of the defect is predicted to be acquired based on the amount of residual gas.

In other words, the amount of residual bubbles between the pattern part 108 and the substrate 103 when a mold imprinting operation is input to be operated in a simulator is calculated, as in the imprinting device 100. Then, the number of unfilled spots (distribution of non-filling) of the imprinting material 105 remaining when imprinting ends may be acquired based on the amount of residual bubbles.

Further, instead of acquiring the distribution of non-filling defect from simulation, a distribution of non-filling defect may be acquired by using the imprinting device and the defect inspection device in a similar method to that of the first embodiment.

Further, although steps S903 and S904 are expressed in parallel with step S905 in FIG. 9, for example, the processing of step S905 may be performed after steps S903 and S904.

In step S906, the curvature at the position at which a non-filling defect has occurred is acquired from the chronological change in the distribution of the curvature calculated in step S904 and the distribution of defect acquired in step S904.

In step S907, the maximum value of the transition of the curvature extracted in step S906 is obtained as in step S208, and it is held as a threshold of the curvature (curvature threshold) at the position of the defect of filling. As described above, in steps S907 and S907, the curvature threshold is acquired based on the position of the defect acquired in step S905 and the change of the curvature acquired in step S904.

Figure 10:
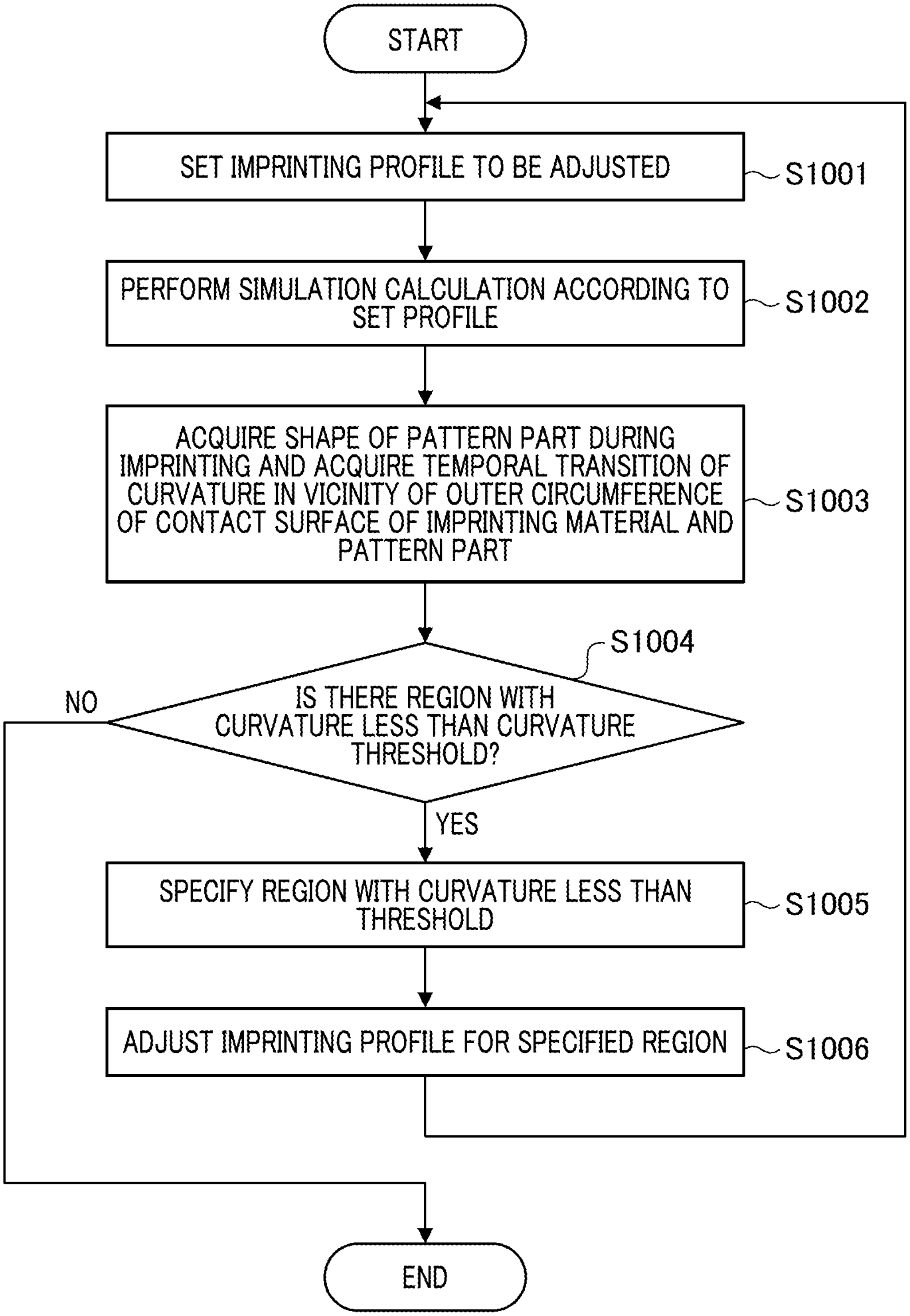
FIG. 10 is a flowchart showing the flow of adjusting an imprinting profile according to the second embodiment.

Next, FIG. 10 is a flowchart showing the flow of adjusting an imprinting profile according to the second embodiment, and the flow of imprinting profile adjustment using the curvature threshold will be described using FIG. 10.

Further, the operation of each step of the flowchart of FIG. 10 is performed by the processor 801 as a computer executing the simulation program 805 as a computer program stored in the memory 804.

First, in step S1001, a chronological profile about imprinting force, cavity pressure, or the like to be adjusted is set as an imprinting profile. Further, the imprinting profile that is set in step S1001 may be the same as or different from the imprinting profile serving as the base that is set in step S901.

Next, in step S1002, simulated calculation is executed according to the profile that is set in step S1001 to obtain output data.

In step S1003, the shape of the pattern part 108 during imprinting is acquired, and temporal transition data of the curvature in the vicinity of the outer circumference of the contact surface of the pattern part 108 and the imprinting material 105 is acquired.

After that, in step S1004, it is determined whether there is a region with a curvature less than the curvature threshold, as in the first embodiment. If there is no section whose curvature is less than the curvature threshold in step S1004, the imprinting profile optimization flow of FIG. 10 ends.

If there is a region with a curvature less than the curvature threshold in step S1004, what time (which region) the curvature is less than the threshold is specified in step S1005. In other words, the time (or region) in which the curvature is less than the curvature threshold is specified.

Then, in step S1006, the imprinting force, cavity pressure, and the like at a specified time (region) are adjusted to adjust the imprinting profile. Here, the imprinting profile includes at least one of a chronological profile of the imprinting force, a chronological profile of a positional relationship (for example, speed, etc.), and a chronological profile of a pressure to deform the pattern part in a convex shape, as in the first embodiment.

In addition, a method of adjustment is slowing down the imprinting speed for the region, for example, as in the first embodiment. Alternatively, the cavity pressure in the region may be increased. Further, steps S906, S907, S1005, and S1006 function as a profile adjustment step (profile adjustment unit) of adjusting the imprinting profile of the pattern part such that the curvature does not fall below the predetermined threshold.

After adjustment is performed, the process returns to step S1001, and simulation calculation is performed again. This is repeated in step S1004 until it is determined that there is no region with a curvature less than the curvature threshold, and if it is determined that there is no region with a curvature less than the curvature threshold in step S1004, the flow of FIG. 10 ends.

Then, the control part 111 of the imprinting device 100 uses the imprinting profile adjusted as described above to perform an actual imprinting operation (an operation of imprinting the pattern part 108 on the imprinting material 105). Thus, imprinting with no non-filling defect can be realized.

Although the adjustment flow of the second embodiment is approximately similar to that of the first embodiment, the second embodiment is characteristic in that conversion of an image of the spread camera and inspection work using a defect inspection device are not involved. By configuring as described above, time and cost required for targeted an imprinting profile adjustment can be further reduced.

In addition, determination, adjustment, and the like in the curvature threshold determination flow and the imprinting profile adjustment flow are not necessarily performed by a person, and similar determination and adjustment may be automatically performed by the information processing device based on a predetermined algorithm. By configuring as described above, time required for the imprinting profile adjustment can be further reduced.

By using a lithography device, or the like of the imprinting device according to the first and second embodiments, or the like, for example, the productivity and quality in manufacturing of an article such as an element having a microdevice or a microstructure such as a semiconductor device, or the like can be improved.

Next, a method for manufacturing a device as an article (a semiconductor device, a magnetic storage medium a liquid crystal display element, etc.) will be described by using the imprinting device according to the first and second embodiments.

The manufacturing method includes a pattern formation step (pattern forming step) of forming a pattern of the pattern part on the imprinting material on the surface of the substrate (wafer, glass plate, film-like substrate, etc.) by using the imprinting device according to the first and second embodiments.

Here, a step of transferring the pattern of a mold includes a pattern formation step of forming a flat pattern. In addition, the substrate is not limited to being of a single base material, and may include a multilayer structure. Alternatively, a pattern formation step of exposing a pattern on a photoreceptor on the substrate by using the lithography device may be included.

The manufacturing method includes a step of processing the substrate before or after the pattern formation step. The processing step includes, for example, a step of removing a residual film from the substrate on which the pattern has been formed and a development step (step).

In addition, known manufacturing steps such as a step of etching the substrate using the pattern as a mask, a step of cutting out the chip from the substrate (dicing), a step of disposing a chip and electrically connecting the chip to a frame (bonding), and a step of sealing the chip with a resin (molding) can be included.

The method for manufacturing an article using the imprinting device, the information processing device, and the like according to the present embodiment can efficiently reduce non-filling defects, compared to that of the past, and thus it is advantageous in terms of property, quality, productivity, production cost, and the like of the article.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing device through a network or various storage media. Then, a computer (or a CPU, an MPU, or the like) of the information processing device may be configured to read and execute the program. In such a case, the program and the storage medium storing the program configure the present invention.

This application claims the benefit of Japanese Patent Application No. 2022-023516 filed on Feb. 18, 2022, which is hereby incorporated by reference herein in its entirety.

What is claimed is:

1. An information processing device that performs simulation of imprinting with an imprinting device, the information processing device comprising:

at least one processor or circuit configured to function as a curvature acquisition unit configured to acquire a change of a curvature of a pattern part in a vicinity of an outer circumference of a contact surface between the pattern part and an imprinting material when the pattern part is brought in contact with the imprinting material in the imprinting; and a profile adjustment unit configured to adjust a profile of the imprinting of the pattern part such that the curvature does not fall below a predetermined threshold.

2. The information processing device according to claim 1, wherein the at least one processor or circuit is further configured to function as a defect position acquisition unit configured to acquire a position of a defect of the imprinting.

3. The information processing device according to claim 2, wherein the defect position acquisition unit obtains a pressure of a gas between the pattern part and the imprinting material, obtains an amount of residual gas between the pattern part and the imprinting material when the imprinting ends based on the pressure of the gas, and acquires the position of the defect based on the amount of the residual gas.

4. The information processing device according to claim 2, wherein the profile adjustment unit acquires the threshold based on the position of the defect acquired by the defect position acquisition unit and the change of the curvature acquired by the curvature acquisition unit.

5. The information processing device according to claim 1, wherein the profile includes at least one of a chronological profile of an imprinting force that presses the pattern part onto the imprinting material in the imprinting, a chronological profile of a positional relationship of the pattern part and the imprinting material, and a chronological profile of a pressure for deforming the pattern part in a shape that is convex toward the imprinting material.

6. The information processing device according to claim 1, wherein the curvature acquisition unit obtains a pressure of a gas between the pattern part and the imprinting material, and acquires the curvature by calculating a shape of the pattern part during the imprinting based on the pressure of the gas.

7. An imprinting device that imprints a pattern of the pattern part on the imprinting material by using the profile adjusted by the information processing device according to claim 1.

8. An imprinting device that imprints a pattern of a pattern part on an imprinting material, the imprinting device comprising:

at least one processor or circuit configured to function as a curvature acquisition unit configured to acquire a change of a curvature of a pattern part in a vicinity of an outer circumference of a contact surface between the pattern part and an imprinting material when the pattern part is brought in contact with the imprinting material in the imprinting;

a profile adjustment unit configured to adjust a profile of the imprinting of the pattern part such that the curvature does not fall below a predetermined threshold; and a control unit configured to imprint the pattern of the pattern part onto the imprinting material using the profile.

9. The imprinting device according to claim 8, wherein the at least one processor or circuit is further configured to function as a defect position acquisition unit configured to acquire a position of a defect of the imprinting.

10. The imprinting device according to claim 9, wherein the defect position acquisition unit includes a measurement unit configured to measure the position of the defect.

11. The imprinting device according to claim 9, wherein the profile adjustment unit acquires the threshold based on the position of the defect acquired by the defect position acquisition unit and the change of the curvature acquired by the curvature acquisition unit.

12. The imprinting device according to claim 8, wherein the profile includes at least one of a chronological profile of an imprinting force that presses the pattern part onto the imprinting material in the imprinting, a chronological profile of a positional relationship of the pattern part and the imprinting material, and a chronological profile of a pressure for deforming the pattern part in a shape that is convex toward the imprinting material.

13. The imprinting device according to claim 8, wherein the curvature acquisition unit includes a beam radiation unit configured to radiate monochromatic light through the pattern part and a sensor configured to capture an interference fringe formed in the vicinity of the outer circumference of the contact surface during the imprinting by using the monochromatic light, and obtains the curvature based on the interference fringe.

14. A non-transitory computer-readable storage medium configured to store a computer program to control an information processing device for performing simulation of imprinting with an imprinting device, wherein the computer program comprises instructions for executing following processes:

a curvature acquisition step of acquiring a change of a curvature of a pattern part in a vicinity of an outer circumference of a contact surface between the pattern part and an imprinting material when the pattern part is brought in contact with the imprinting material in the imprinting; and a profile adjustment step of adjusting a profile of the imprinting of the pattern part such that the curvature does not fall below a predetermined threshold.

15. An article manufacturing method using an imprinting device, the method comprising:

a curvature acquisition step of acquiring a change of a curvature of a pattern part in a vicinity of an outer circumference of a contact surface between the pattern part and an imprinting material when the pattern part is brought in contact with the imprinting material in the imprinting by the imprinting device;

a profile adjustment step of adjusting a profile of the imprinting of the pattern part such that the curvature does not fall below a predetermined threshold;

a pattern formation step of forming the pattern on the imprinting material by using the imprinting device; and a step of developing a substrate on which the pattern is formed in the pattern formation step.

* * * * *